D. L. TILTON.
Plow-Fender.
No. 19,725.
Patented Mar. 23, 1858.
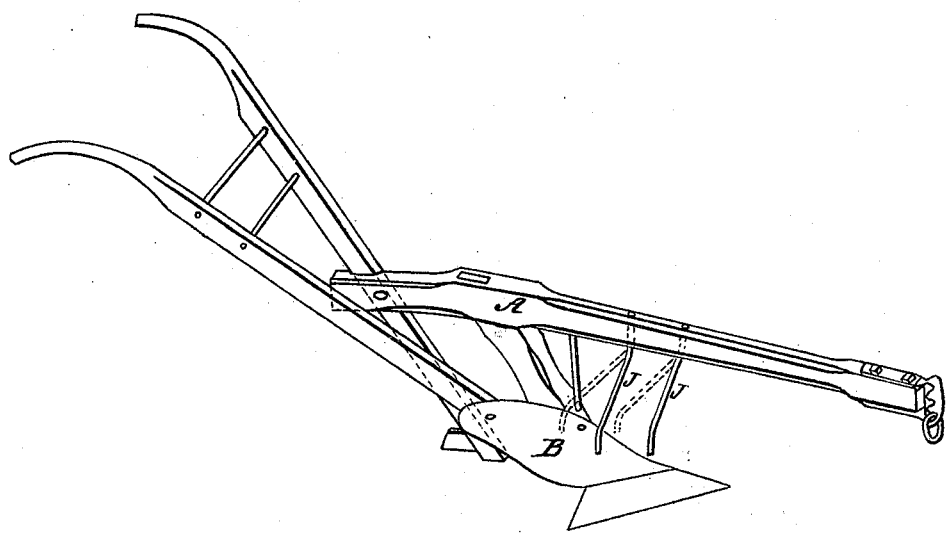

UNITED STATES PATENT OFFICE.

DANL. L. TILTON, OF MOUNT CARMEL, ILLINOIS.

IMPROVEMENT IN PLOWS.

Specification forming part of Letters Patent No. 19,725, dated March 23, 1858.

*To all whom it may concern:*

Be it known that I, DANIEL L. TILTON, of Mount Carmel, Wabash county, Illinois, have invented a new and useful Improvement in Plows; and I hereby declare the following to be a full and exact description of the same, reference being had to the accompanying drawing, making part of this specification.

The present invention consists in a provision by which weeds, brush, &c., are completely covered in the act of plowing.

The accompanying drawing represents, in perspective, a plow embodying my improvement.

The beam A and mold-board B may be of any customary construction.

J J are tines or prongs, one or more in number, journaled perpendicularly in the beam in front of the mold-board, and depending obliquely or in curved form from the under side of the beam to near their ends, where they take a nearly vertical direction. The purpose of these tines is to so present weeds or any other trash which may be upon the ground that they will be completely covered by the furrow-slice—an action which practical use proves them to be very efficient in performing.

The journaling of the tines permits horizontal motion, as indicated by red lines, and in the act of plowing the resistance of the weeds forces the tines obliquely backward and forward at such an angle as is best adapted to bend the weeds downward and forward, so that the turning of the furrow-slice will roll them over on each other, similarly to the strands of a rope, and being deposited closely within the furrow they are completely covered.

I claim as new and of my invention herein—

The construction and arrangement, substantially as described, of the tines J, operating in the manner and for the purposes explained.

In testimony of which invention I hereunto set my hand.

DANIEL L. TILTON.

Attest:
SILAS KENEPP,
JAMES S. JOHNSTON.